US011278863B2

(12) United States Patent
Carroll

(10) Patent No.: US 11,278,863 B2
(45) Date of Patent: Mar. 22, 2022

(54) ION SEPARATION MEDIA AND APPLICATIONS THEREOF

(71) Applicant: Wake Forest University, Winston-Salem, NC (US)

(72) Inventor: David L. Carroll, Winston-Salem, NC (US)

(73) Assignee: Wake Forest University

( * ) Notice: Subject to any disclaimer, the term of this patent is extended or adjusted under 35 U.S.C. 154(b) by 623 days.

(21) Appl. No.: 16/084,752

(22) PCT Filed: Mar. 16, 2017

(86) PCT No.: PCT/US2017/022753
§ 371 (c)(1),
(2) Date: Sep. 13, 2018

(87) PCT Pub. No.: WO2017/161142
PCT Pub. Date: Sep. 21, 2017

(65) Prior Publication Data
US 2019/0070583 A1    Mar. 7, 2019

Related U.S. Application Data

(60) Provisional application No. 62/309,098, filed on Mar. 16, 2016.

(51) Int. Cl.
*B01J 20/02* (2006.01)
*B01J 20/28* (2006.01)
*C02F 1/02* (2006.01)
*C02F 1/28* (2006.01)
*C02F 1/46* (2006.01)
*F04B 37/02* (2006.01)

(52) U.S. Cl.
CPC ....... *B01J 20/0285* (2013.01); *B01J 20/0218* (2013.01); *B01J 20/28007* (2013.01); *B01J 20/28011* (2013.01); *C02F 1/02* (2013.01); *C02F 1/281* (2013.01); *C02F 1/4604* (2013.01); *F04B 37/02* (2013.01); *C02F 2305/08* (2013.01)

(58) Field of Classification Search
CPC ............... B01J 20/0285; B01J 20/0218; B01J 20/28007; B01J 20/28011; C02F 1/02; C02F 1/281; C02F 1/4604; F04B 37/02
See application file for complete search history.

(56) References Cited

U.S. PATENT DOCUMENTS

2004/0187905 A1* 9/2004 Heremans ............... H01L 35/34
                                                                  136/238

OTHER PUBLICATIONS

Acerce et al., Nature Nanotechnology, vol. 10, No. 4, Mar. 23, 2015 (Mar. 23, 2015), p. 313-318.*
Heiranian et al., Nature Communications, vol. 6, Oct. 14, 2015, p. 8616.*
Li et al., ACS Nano, vol. 10, No. 2, Feb. 23, 2016 (Feb. 23, 2016), p. 1829-1835.*
Goloveshkin et al., Langmuir, vol. 31, No. 32, Aug. 18, 2015 (Aug. 18, 2015), p. 8953-8960.*
Buscema et al., Nano Letters, vol. 13, No. 2, Feb. 13, 2013 (Feb. 13, 2013), p. 358-363.*
International Search Report and Written Opinion corresponding to PCT/US2017/022753, dated Jul. 3, 2017, 13 pages.
Acerce, Muharrem et al., Metallic 1T Phase MoS2 Nanosheets as Supercapacitor Electrode Materials, Nature Nanotechnology, vol. 10, No. 4, Mar. 23, 2015, pp. 313-318, XP055385035.
Heiranian, Mohammad et al., Water Desalination with a Single-Layer MoS2 Nanopore, Nature Communications, vol. 6, Oct. 14, 2015, pp. 1-6, XP055385036.
Li, Weifeng et al., Tunable, Strain-Controlled Nanoporous MoS 2 Filter for Water Desalination, ACS Nano, vol. 10, No. 2, Feb. 23, 2016, pp. 1829-1835, XP055385043.
Goloveshkin, Alexander S. et al., Stabilization of 1T-MoS 2 Sheets by Imidazolium Molecules in Self-Assembling Hetero-layered Nanocrystals, Langmuir, vol. 31, No. 32, Aug. 18, 2015, pp. 8953-8960, XP055385045.
Buscema, Michele et al., Large and Tunable Photothermoelectric Effect in Single-Layer MoS 2, Nano Letters, vol. 13, No. 2, Feb. 13, 2013, pp. 358-363, XP055385042.

* cited by examiner

*Primary Examiner* — Yong L Chu
(74) *Attorney, Agent, or Firm* — Tomas Friend

(57) ABSTRACT

Ion separation media are described herein employing thermoelectric materials and architectures. In some embodiments, an ion separation medium comprises a layer of inorganic nanoparticles having a Seebeck coefficient sufficient to transport ionic species in a liquid medium along surfaces of the layer in the presence of a thermal gradient.

17 Claims, 4 Drawing Sheets

ION SEPARATION MEDIA AND APPLICATIONS THEREOF

RELATED APPLICATION DATA

This application is a U.S. National Phase of PCT/US2017/022753, filed Mar. 16, 2017, which claims priority pursuant to 35 U.S.C. § 119(e) to U.S. Provisional Patent Application Ser. No. 62/309,098 filed Mar. 16, 2016, each of which is incorporated herein by reference in its entirety.

FIELD

The present invention relates to media for separation of ionic species in a liquid medium and, in particular, to media employing thermoelectric architectures having Seebeck coefficients sufficient to transport ionic species along various surfaces in a thermal gradient.

BACKGROUND

Thermoelectric materials and apparatus are widely used for the generation of electricity from heat sources. Thermoelectric apparatus, for example, can be employed to generate electricity from waste heat generated in various industrial applications. Thermoelectric efficiency is quantified by the Figure of Merit, ZT.

Thermoelectric materials demonstrating higher ZT values have higher thermoelectric efficiencies. Fabricating thermoelectric materials with reasonable ZT values is often difficult and/or expensive. Bismuth chalcogenides, for example, provide excellent thermoelectric properties with ZT values ranging from 0.7 to 1.0. These materials can be nanostructured to produce a superlattice structure of alternating $Bi_2Te_3$ and $Bi_2Se_3$ layers resulting in a material having acceptable electrical conductivity and poor thermal conductivity. Fabrication of these materials, nevertheless, can be time consuming and expensive.

Moreover, as a result of fabrication requirements and other material tolerances, many thermoelectric materials do not lend themselves to facile incorporation into a wide variety of devices for heat collection and electrical generation. These disadvantages call for new uses of thermoelectric materials.

SUMMARY

In one aspect, thermoelectric materials and architectures described herein find application in separation of ionic species in liquid media. Such thermoelectric architectures can be employed in a variety of fields including, but not limited to, water desalination, various sensors and/or molecular purification systems. In some embodiments, an ion separation medium described herein comprises a layer of inorganic nanoparticles having a Seebeck coefficient sufficient to transport ionic species in a liquid medium along surfaces of the layer in the presence of a thermal gradient. The layer of inorganic nanoparticles, in some embodiments, is porous thereby permitting ionic species to be transported through the layer. Ionic species transported by separation media described herein can include cations and anions of salts, transition metals, biological molecules, organic molecules or mixtures thereof.

In another aspect, ion pumps are provided. An ion pump, in some embodiments, comprises an analyte compartment for receiving a liquid medium comprising an ionic species. An ion collection compartment is in ionic communication with the analyte compartment via a layer of inorganic nanoparticles having a Seebeck coefficient sufficient to transport the ionic species from the analyte compartment to the ion collection compartment in the presence of a thermal gradient.

In another embodiment, an ion pump comprises an analyte compartment for receiving a mixture including a first ionic species and a second ionic species in a liquid medium. A first ion collection compartment is in ionic communication with the analyte compartment via a layer of inorganic nanoparticles having a Seebeck coefficient sufficient to transport the first ionic species from the analyte compartment to the first ion collection compartment in the presence of a thermal gradient. A second ion collection compartment is also in ionic communication with the analyte compartment via the layer of inorganic nanoparticles, wherein the Seebeck coefficient is sufficient to transport the second ionic species from the analyte compartment to the second ion collection compartment in the presence of the thermal gradient.

These and other embodiments are described further in the following detailed description.

DETAILED DESCRIPTION

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

I. Ion Separation Media

Ion separation media are described herein employing thermoelectric materials and architectures. In some embodiments, an ion separation medium comprises a layer of inorganic nanoparticles having a Seebeck coefficient sufficient to transport ionic species in a liquid medium along surfaces of the layer in the presence of a thermal gradient. Any inorganic nanoparticles operable to provide a layer having a Seebeck coefficient sufficient for ion transport in a thermal gradient can be employed. Suitable inorganic nanoparticles can comprise transition metal chalcogenides, such as transition metal dichalcogenides ($MX_2$). Specific examples of transition metal dicalcogenides include, but are not limited to, $MoS_2$, $TiS_2$ and $WS_2$. Inorganic nanoparticles can also be formed of ternary transition metal chalcogenides, quaternary metal chalcogenides or mixtures thereof. In further embodiments, inorganic nanoparticles include transition metal nanoparticles, ceramic nanoparticles or mixtures thereof. Transition metal nanoparticles, in some embodiments, comprise metal from Groups VIIB, VIIIB, IB and/or IIB of the Periodic Table. Moreover, ceramic nanoparticles can include transition metal oxides, carbides and/or nitrides.

Figure 1:
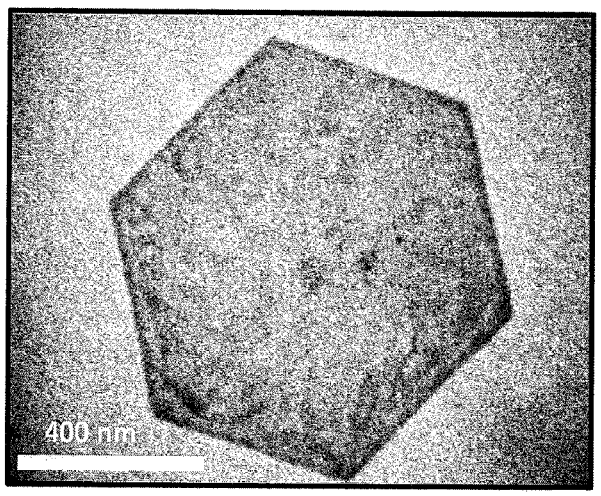
FIG. 1 illustrates platelet morphology of $MoS_2$ nanoparticles according to some embodiments described herein.

The inorganic nanoparticles can have any morphology not inconsistent with the objectives of the present invention. For example, the inorganic nanoparticles can have platelet morphology. Alternatively, the inorganic nanoparticles can have a wire or needle morphology. FIG. 1 illustrates platelet morphology of $MoS_2$ nanoparticles according to some embodiments described herein. Further, the inorganic nanoparticles can have any size not inconsistent with the objectives of the present invention. Generally, the inorganic nanoparticles have at least one dimension less than 100 nm. For platelet morphologies, the inorganic nanoparticles can have thickness of 1-50 nm with diameter greater than 100 nm.

Figure 2:
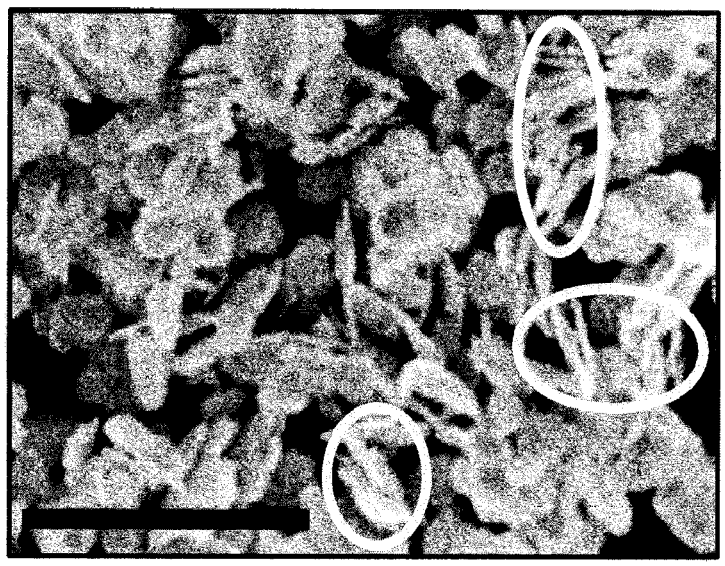
FIG. 2 is optical microscopy of a section of a layer of $MoS_2$ nanoparticles according to one embodiment described herein.

The inorganic nanoparticles can be assembled into a layer by a variety of techniques. In some embodiments, the inorganic nanoparticles are deposited on a surface and pressed into a layer. For example, the inorganic nanoparticles can be placed in a mold and pressed into a layer of any desired shape. Alternatively, the inorganic nanoparticles can be added to a host material to form the layer. In some embodiments, an organic host material can be employed, such as one or more polymeric materials. Suitable polymeric species can include one or more fluoropolymers. In some embodiments, fluoropolymer comprises polyvinylidene fluoride (PVDF), polyvinyl fluoride (PVF), polyvinylidene fluoride-trifluoroethylene (PVDF-TrFE), polyvinylidene fluoride-tetrafluoroethylene (PVDF-TFE), polytetrafluoroethylene (PTFE), or mixtures or copolymers thereof. Loading of the inorganic nanoparticles in a host can generally range from about 50 wt. % to 99 wt. % of the resulting layer. In some embodiments, inorganic nanoparticle loading ranges from 60-80 wt. %. FIG. 2 illustrates optical microscopy of a section of a layer of $MoS_2$ nanoparticles according to one embodiment described herein.

The layer of inorganic nanoparticles can have any thickness not inconsistent with the objectives of the present invention. In some embodiments, the layer of inorganic nanoparticles has thickness selected from Table I.

TABLE I

| Inorganic Nanoparticle Layer Thickness (μm) |
| --- |
| 0.010-1000 |
| 0.050-750 |
| 0.1-500 |
| 50-800 |
| 100-600 |

Additionally, the layer of inorganic nanoparticles can be porous. As detailed further herein, porosity of the layer can permit transport of ionic species through the layer, enhancing separation of ionic species when the layer of inorganic nanoparticles is placed in a thermal gradient. In some embodiments, the layer of inorganic nanoparticles has porosity selected from Table II.

TABLE II

| Inorganic Nanoparticle Layer Porosity (vol. %) |
| --- |
| 1-60 |
| 5-50 |
| 10-40 |

TABLE II-continued

| Inorganic Nanoparticle Layer Porosity (vol. %) |
| --- |
| 15-35 |
| ≥15 |

Moreover, the layer of inorganic nanoparticles, in some embodiments, has an average pore size less than 1 μm. Average pore size of a layer of inorganic nanoparticles, for example, can range from 50 nm to 500 nm. In some embodiments, a layer of inorganic nanoparticles can have an average pore size of 100-750 nm. In other embodiments, a layer of inorganic nanoparticles can have an average pore size greater than 1 μm, such as 1-10 μm.

In some embodiments, the layer of inorganic nanoparticles has a hydrophilic region transitioning to a hydrophobic region in a direction of the thermal gradient. The hydrophilic and hydrophobic regions of the inorganic nanoparticle layer can be formed according to any technique not inconsistent with the objectives of the present invention. In some embodiments, the hydrophilic or hydrophobic character of the inorganic nanoparticles can be changed. For example, $MoS_2$ platelets can be deposited to form the layer. A region of the $MoS_2$ layer is heated to 150° C. to locally change the conformational structure from $1T-MoS_2$ to $2H-MoS_2$. This conformational change establishes a hydrophobic $2H-MoS_2$ region. Unheated region(s) of the layer remain hydrophilic $1T-MoS_2$. In other embodiments, carrier of the inorganic nanoparticles can provide regions of hydrophilic and hydrophobic character. In further embodiments, surfaces of the inorganic nanoparticles can be modified with the various species, such as ligands, to impart regions of hydrophilic and hydrophobic character. Surface ligands can also be employed to capture ionic species transported by the layer of inorganic particles, thereby enhancing ion separation properties of media described herein.

As described above, the layer of inorganic nanoparticles has a Seebeck coefficient sufficient to transport ionic species in a liquid medium. In some embodiments, the layer of inorganic nanoparticles has a Seebeck coefficient selected from Table III.

TABLE III

| Seebeck Coefficient (μV/K at 298K) |
| --- |
| ≥40 |
| ≥50 |
| 50-100 |
| 60-80 |

Table IV provides thermoelectric and conduction properties of a layer of $1T-MoS_2$ nanoplatelets under non-deionized water according to one embodiment described herein.

TABLE IV

| | Properties of $MoS_2$ Layer | | |
| --- | --- | --- | --- |
| Material | Seebeck Coef. (μV/K) | Conductivity (S/m) | Power Factor [μW/(mK$^2$)] |
| $1T-MoS_2$ (60-70%) | 86.9 | 7483 | 56.5 |

In addition, the inorganic nanoparticle layer is sensitive to temperature fluctuations and only requires relatively small thermal gradients to initiate transport of ionic species. In some embodiments, a thermal gradient of at least 0.5° C. can result in ion transport along surfaces of the layer of inorganic nanoparticles. In some embodiments, suitable thermal gradients are selected from Table V.

TABLE V

| Thermal Gradient (° C.) |
| --- |
| 1-140 |
| 2-100 |
| 3-50 |
| ≥1 |

II. Ion Pumps

In another aspect, ion pumps are provided. An ion pump, in some embodiments, comprises an analyte compartment for receiving a liquid medium comprising an ionic species. An ion collection compartment is in ionic communication with the analyte compartment via a layer of inorganic nanoparticles having a Seebeck coefficient sufficient to transport the ionic species from the analyte compartment to the ion collection compartment in the presence of a thermal gradient.

In another embodiment, an ion pump comprises an analyte compartment for receiving a mixture including a first ionic species and a second ionic species in a liquid medium. A first ion collection compartment is in ionic communication with the analyte compartment via a layer of inorganic nanoparticles having a Seebeck coefficient sufficient to transport the first ionic species from the analyte compartment to the first ion collection compartment in the presence of a thermal gradient. A second ion collection compartment is also in ionic communication with the analyte compartment via the layer of inorganic nanoparticles, wherein the Seebeck coefficient is sufficient to transport the second ionic species from the analyte compartment to the second ion collection compartment in the presence of the thermal gradient.

Figure 3:
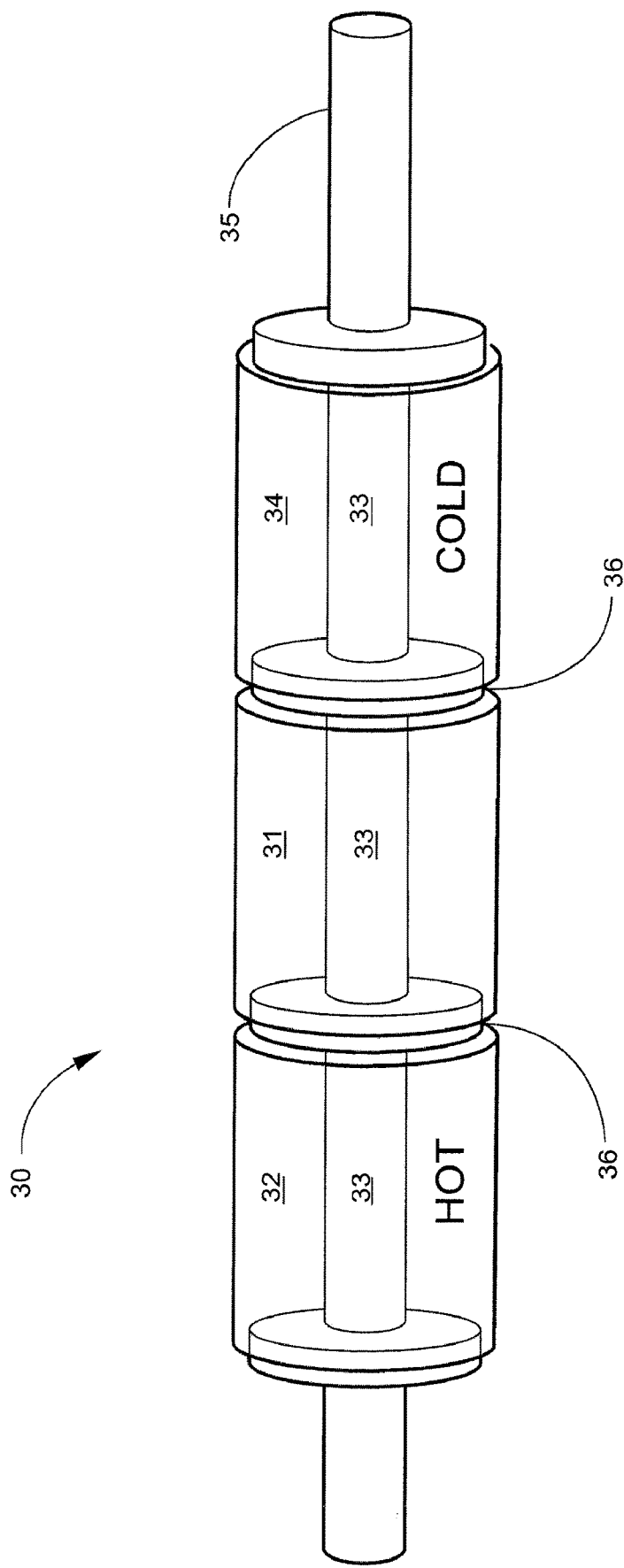
FIG. 3 illustrates an ion pump according to some embodiments described herein.

The layer of inorganic nanoparticles can have any construction and/or properties described in Section I herein. FIG. 3 illustrates an ion pump construction according to some embodiments described herein. The ion pump 30 comprises an analyte compartment 31 for receiving a mixture of first and second ionic species. A first ion collection compartment 32 is in ionic communication with the analyte compartment 31 via a layer of inorganic nanoparticles 33. Moreover, a second ion collection compartment 34 is ionic communication with the analyte compartment via the layer of inorganic nanoparticles 33. In the embodiment of FIG. 3, the layer of inorganic nanoparticles 33 is deposited on the outer surface of a rod 35 running through each of the compartments. O-rings 36 are positioned between the compartments to prevent mixing. Hot water can be flowed into the first ion collection compartment 32, and cold water can be flowed into the second ion collection compartment 34 to establish the thermal gradient. With the thermal gradient established, first ionic species in the analyte compartment 31 is transported along surfaces of the layer of inorganic particles 33 to the first ion collection compartment 32. The layer of inorganic nanoparticles 33 is porous, thereby permitting the first ionic species to travel through the layer 33 and under the O-rings 36 to reach the first compartment 32. Similarly, the second ionic species is transported through the layer of inorganic nanoparticles 33 to reach the second ion collection compartment 34. To enhance ion transport, the layer of inorganic nanoparticles can be hydrophobic in character in the first ion collection compartment 32 and hydrophilic in character in the second ion collection compartment or vice versa. As first and second ionic species are transported out of the analyte compartment 31, fresh mixture of first and second ionic species can be added to the analyte compartment 31 for further ionic separation.

Figure 4:
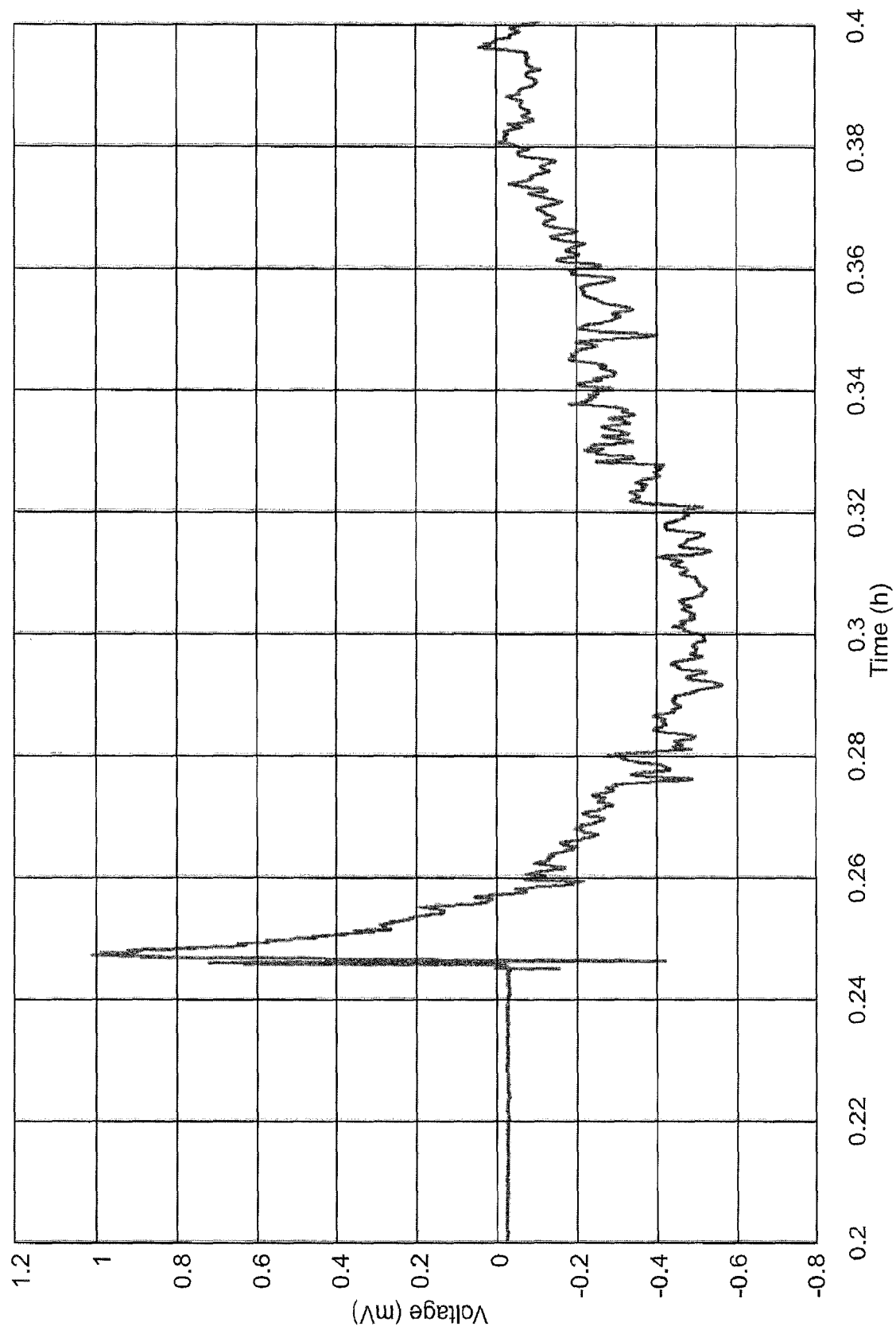
FIG. 4 illustrates voltage characteristics of an ion pump according to some embodiments described herein.

An ion pump having the configuration of FIG. 3 was constructed with a layer of $MoS_2$ having morphology illustrated in FIG. 2. The $MoS_2$ was hydrophobic 2H in the first ion collection compartment and hydrophilic 1T in the second ion collection compartment. Salt water (NaCl) was added to the analyte compartment, and a thermal gradient established as in FIG. 3. $Cl^-$ was transported to the first ion compartment and $Na^+$ was transported to the second ion compartment. Such ion flow purified the water in the analyte compartment. In terms of liters of purified water per second per $\Delta T[L/(s\Delta T)]$, it depends on the NaCl concentration. Estimates are $1 \times 10^7$ ion removed per liter per second per $\Delta T$. Ion removal from the salt water is illustrated in FIG. 4. When the salt water initially contacts the layer of $MoS_2$ nanoparticles in the thermal gradient, a large voltage spike occurs. As the ion concentration is reduced due to transport out of the analyte chamber, the voltage decays and returns to zero.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. An ion pump comprising:
an analyte compartment for receiving a mixture including a first ionic species and a second ionic species in a liquid medium; and
a first ion collection compartment in ionic communication with the analyte compartment via a layer of inorganic nanoparticles having a Seebeck coefficient of greater than or equal to 40 µV/K at 298° K to transport the first ionic species from the analyte compartment to the first ion collection compartment in the presence of a thermal gradient, wherein
the inorganic nanoparticles comprise one or more transition metal chalcogenides, and wherein the layer of inorganic nanoparticles further comprises one or more fluoropolymers selected from the group consisting of polyvinylidene fluoride (PVDF), polyvinyl fluoride (PVF), polyvinylidene fluoride-trifluoroethylene (PVDF-TrFE), polyvinylidene fluoride-tetrafluoroethylene (PVDF-TFE), polytetrafluoroethylene (PTFE), or mixtures or copolymers thereof.

2. The ion pump of claim 1, wherein the layer of inorganic nanoparticles is porous.

3. The ion pump of claim 1, wherein the layer of inorganic nanoparticles has porosity up to 50 vol. %.

4. The ion pump of claim 2, wherein the first ionic species are transported to the first ion collection chamber through pore structure of the layer of inorganic nanoparticles.

5. The ion pump of claim 1 further comprising a second ion collection compartment in ionic communication with the analyte compartment via the layer of inorganic nanoparticles, to transport the second ionic species from the analyte compartment to the second ion collection compartment in the presence of the thermal gradient.

6. The ion pump of claim 5, wherein the layer of inorganic nanoparticles has a hydrophilic region transitioning to a hydrophobic region in a direction of the thermal gradient.

7. The ion pump of claim 6, wherein the hydrophobic region extends into the first ion collection compartment and the hydrophilic region extends into the second ion collection compartment.

8. The ion pump of claim 1, wherein the inorganic nanoparticles comprise molybdenum disulfide.

9. The ion pump of claim 1, wherein the transition metal chalcogenides are transition metal dichalcogenides.

10. The ion pump of claim 9, wherein the transition metal dichalcogenides comprise $TiS_2$, $WS_2$ or mixtures thereof.

11. The ion pump of claim 1, wherein the inorganic nanoparticles have platelet morphology.

12. The ion pump of claim 11, wherein the platelet morphology has thickness of 1-50 nm and diameter greater than 100 nm.

13. The ion pump of claim 1, wherein the inorganic nanoparticles have a Seebeck coefficient greater than or equal to 50-100 μV/K at 298° K.

14. The ion pump of claim 6, wherein the hydrophilic region comprises inorganic nanoparticles of $1T-MoS_2$, and the hydrophobic region comprises inorganic nanoparticles of $2H-MoS_2$.

15. The ion pump of claim 1, wherein the layer of inorganic nanoparticles is pressed.

16. The ion pump of claim 1, wherein the inorganic nanoparticles are present in an amount of 60-80 wt. % of the layer.

17. The ion pump of claim 1, wherein the layer has a thickness of 0.050 μm to 750 μm.

\* \* \* \* \*